United States Patent [19]

Rungger et al.

[11] Patent Number: 4,655,109
[45] Date of Patent: Apr. 7, 1987

[54] METHOD AND APPARATUS FOR SEVERING COMPARATIVELY LONG WORKPIECES, SUCH AS PIPES, IN PARTICULAR AT HIGH TEMPERATURES

[75] Inventors: Helmut Rungger, Roitham, Austria; Ernst Linsinger, deceased, late of Steyrermühl, Austria, by Margarete Linsinger, heir

[73] Assignee: Dr. Techn. Linsinger & Co. Gesellschaft m.b.H., Steyrermühl, Australia

[21] Appl. No.: 363,024

[22] Filed: Mar. 29, 1982

[30] Foreign Application Priority Data

Apr. 1, 1981 [DE] Fed. Rep. of Germany ....... 3113072

[51] Int. Cl.[4] ................................................ B23B 5/14
[52] U.S. Cl. ........................................... 82/47; 82/61
[58] Field of Search ................ 82/46, 47, 59, 61, 70.2

[56] References Cited

U.S. PATENT DOCUMENTS 3,724,073 4/1973 Lewandowski ......................... 82/59
3,839,933 10/1974 Paramonoff ............................ 82/61

FOREIGN PATENT DOCUMENTS 2363659 7/1975 Fed. Rep. of Germany .......... 82/59
1111292 2/1956 France .................................... 82/59
420412 8/1974 U.S.S.R. ................................ 82/47
582069 11/1977 U.S.S.R. ................................ 82/59

Primary Examiner—W. D. Bray
Attorney, Agent, or Firm—Browdy and Neimark

[57] ABSTRACT

For severing long workpieces, in particular pipes of metal material, especially at high temperatures, in a normal plane relative to the axis at an arbitrary site with the aid of a metal-cutting tool, a workpiece is firmly clamped and at a standstill, while the tool is guided in an interrupted cut around the workpiece with continuous radial advancement. The tool remains in engagement with the workpiece over only a portion of its path, which is effected by way of example in that the central circling of the cutting movement has superimposed upon it an eccentric planetary movement, so that the line of cutting is not a continuous circular line. In an apparatus for performing this method, a knife head (3) equipped with cutting knives (5) is seated on the end toward the cut of a hollow working shaft (2) rotating in a housing (1). A hollow control shaft (7) is preferably supported centrally in the hollow working hsaft (2) carrying the knife head (3). During idling, the hollow control shaft (7) rotates in synchronism with the hollow working shaft (2) via a planetary gear (9, 10); during cutting, however, the hollow control shaft (7) executes a relative movement with respect to the hollow working shaft (2).

7 Claims, 7 Drawing Figures

METHOD AND APPARATUS FOR SEVERING COMPARATIVELY LONG WORKPIECES, SUCH AS PIPES, IN PARTICULAR AT HIGH TEMPERATURES

FIELD OF THE INVENTION

The invention relates to a method of an apparatus for severing comparatively long workpieces, such as pipes, of metal material, in particular at high temperatures (for example, steel glowing red-hot), in a normal plane relative to the axis at an arbitrary site.

BACKGROUND OF THE INVENTION

It is known to sever rotating pipes normal to the axis by means of metal-cutting "turning" (plunge cutting), with the aid of a cutting tool advanced transversely relative to the workpiece axis. A typical example is cutting performed on a lathe. In such an operation, a long chip or shaving is produced, depending upon the cutting depth. Means exist for breaking such a chip. Difficulties can be encountered with alloy materials. The chips harden and may have sharp edges, which present the danger of injury. There are limits to this method, which in itself is simple, if the workpieces are quite long—that is, for instance if parts are to be cut off from long, rolled rounded-profiled elements. Long workpieces of this kind are frequently not capable of rotating at a speed such as is required for an economically favorable cutting speed. Rounded-profiled elements of small diameter must furthermore be well guided, for instance in sheathing pipes; but experience has shown that sheathing is associated with a high noise level.

In the case of workpiece at high temperature, such as those in a glowing red-hot state, the above method is intrinsically impossible. Severing has then been performed using high-powered saws. This latter method has been developed to a state of technical perfection, but extremely high noise levels are unavoidable.

When brief cutting times are critical, which is particularly important in the case of red-hot workpieces, a high cutting speed and small tooth pitch must be selected. This results in a high frequency of cutting operations, thus causing high-frequency acoustical oscillations which may have their source in either the saw blade or the pipe itself or both. Glowing chips are also thrown off, and wide ridges are formed at the cutting site; in fact, the pipe may even become completely closed at its end. These disadvantages, and particularly the great environmental stress, make it urgently necessary to provide an improved solution to the problem.

SUMMARY OF THE INVENTION

Objects of the invention are to avoid these grave technical and commercial disadvantages of the known methods; to provide a method of the general type discussed above such that it is capable of satisfying present-day demands for protecting both the environment and health in a superior manner; and to provide an apparatus for effecting such results.

Such objects are attained in accordance with the invention in that the workpiece is at a standstill while being machined; that it is clamped at either side of the cutting plane in fixed tension blocks; that a cutoff knife or knives, firmly inserted in a knife head seated at the end of a hollow shaft, travel in a circle about the workpiece, making an interrupted cut and thereby producing a chip of limited length; and that a hollow working shaft, driven by a motor, operates within a housing that is mounted on an adjustable transverse carriage of a longitudinal guideway.

In principle, this is a turning procedure, in which in an advantageous manner a cutting knife, which is radially guided in a revolving knife head, is continuously advanced toward the workpiece axis. In order to limit the chip length, the cutting knife is backed up again by the thickness of the chip or in other words retracted from the cut after each revolution (or even better, after somewhat more than one revolution) and immediately thereafter is advanced again by twice this chip thickness.

The determining factor in the invention is that the line of cutting is not a continuous circular line. One example of such a realization is that a cutting knife is retracted out of the cut by approximately the measure of the chip thickness after each revolution (efficaciously after somewhat more than one revolution), or in other words backed up, and then is immediately advanced radially further. The path of the cut may then in principle be either a circle or a spiral.

In accordance with a further advantageous embodiment of the invention, the radial advancement of the knife is controlled by circuitry, for instance by computerized numerical control, such that the knife blade describes a quasi-circular arc, approximately analogous to a planetary movement, and that the knife or knives execute a superimposed radial advancement movement.

In accordance with this embodiment of the method according to the invention, an eccentric planetary movement is superimposed on the central circling movement of the cutting operation or a back and forth movement is performed. It is thereby attained that the cutting knife, without requiring complicated mechanical accessories, remains in engagement over only a portion of its travel path. Furthermore, the cutting action is divided into a hot path and a cold path. The tool is not continuously engaged and has time, as it travels a relatively long distance as a rule, to cool down. The chip or shaving curls up and can be removed easily without making added provisions.

If the cutting knife (or knives) is (or are) embodied as radially advanceable in the knife head, then the planetary movement can also be simulated. In obedience to the desire to automate the procedure, the advancement is advantageously controlled by a numerical control or computerized numerical control means. In the same manner, the automatic control can be utilized in order to adapt the rotational speed of the tool spindle to the decreasing diameter of the workpiece; that is, to regulate the rpm to a constant cutting speed. An automatic control of this kind can easily assume a further function, if the radial advancement of the cutting knife or knives is made discontinuous by superimposing a relative movement similar to the planetary movement. The result is then, according to the invention, the same as with the planetary movement. The knife or knives execute a discontinuous radial movement, but they remain in engagement over only a partial arc of the revolving movement. The arc of engagement travels over the circumference of the workpiece. In an efficacious manner, the knife head is equipped with at least two cutting knives.

In another embodiment of the method according to the invention, a hollow working shaft and a hollow control shaft are interconnected via a planetary gear, and the planetary ring of this planetary gear, via its own motor, effects a relative movement between the hollow working shaft and the hollow control shaft, which radially displaces the knife holder or holders.

The rotational speed of the hollow working shaft is advantageously increased during the course of the severing operation in proportion with the cutting depth.

This provision attains a further shortening of the cutting time according to the invention, that is, if the rotational speed of the knife movement is adapted to the decreasing diameter of the circular tool path, or in other words if the rpm of the hollow shaft of the knife head is continuously increased during the course of cutting.

It hardly needs mentioning that the radial advancement of the knives is effected, after each revolution, by an amount equal to the chip thickness.

A temperature measuring device is advantageously provided, which monitors the temperature of the workpiece, and if there is a failure to attain its temperature, the monitoring device blocks the severing device.

It is particularly advantageous for the direction in which the planetary movement of the housing rotates to be inverse to the rotational direction of the hollow working shaft.

In an efficacious manner, the tool spindle and the planetary movement are each provided with their own drive mechanism. The tool spindle, which for the purpose of severing pipes may be a hollow shaft, is supported by way of example in a second hollow shaft, which in turn operates eccentrically within a housing mounted on a longitudinally displaceable carriage.

The invention also relates to an apparatus for severing comparatively long workpieces, such as pipes, of metal material, in particular at high temperatures (for instance, steel in the glowing red-hot state) in a plane normal relative to the axis at an arbitrary site with the aid of a metal-cutting tool and intended in particular for performing the method according to the invention.

The apparatus according to the invention is characterized in that a knife head equipped with cutting knives is seated on the end nearer the cut of a hollow working shaft rotating within a housing; that the housing carries two laterally attached and axially parallel tabs with bearing bores; that the housing is received in tangs of eccentric shafts, which rotate in turn in bearing blocks seated on a base plate and are driven by an efficaciously infinitely variable electromotor; that the eccentric shafts of the two bearing blocks are interconnected for synchronous rotation; that furthermore the cutting knife or knives or its (their) knife holder or holders is or are radially displaceably accommodated in the knife head; and that the cutting knife or knives is or are continuously advanced toward the workpiece during the cutting process by the amount of one selected chip thickness per revolution.

In accordance with a further embodiment of the apparatus according to the invention, the cutting knife, so that it will turn in an interrupted cut, is guided in the radially displaceable knife holder such that it can be deflected inward counter to spring pressure. On its outside, that is, the end opposite from the blade, the cutting knife carries a roller which travels on an inner surface of an annular race secured on the housing. The annular race has a rolloff radius on the inside which becomes steadily smaller locally (by approximately the amount of the selected chip thickness) over a selectable angular range.

The tool spindle (hollow shaft) carries a knife head with radially advanceable knifes on its end toward the cut. The carriage is displaceable on a longitudinal bed and can be adjusted transversely to the longitudinal axis thereof. The tensioning devices for the workpieces are also mounted on the carriage, as a rule at either side of the cutting plane.

In the outset position, the tool spindle and planetary hollow shaft are centrally positioned. Once the tool spindle has attained operating speed, the device is transversely advanced by the amount of eccentricity, and the plantary hollow shaft is set into motion. The point of engagement travels about the workpiece. At the same time, the knives are advanced radially. Thus they "turn" the partitioning seam until it breaks through, the tool always remaining engaged over only a part of the arc; in other words, it makes an interrupted cut. This interruption is a necessary consequence of the geometry of the severing operation.

An important feature of this invention is that the eccentricity of the planetary movement is comparatively small; it is a function of the selected nominal chip thickness. A large volume of cut metal per unit of time is attained if the eccentricity is not greater than approximately twice the chip thickness. The matching of the path of the knife tips to the workpiece is then optimal, and the chip length reaches a maximum. This matching of knife tip path to workpiece remains equally good as the cutting depth increases.

In its shape, the chip could best be described as a wormlike shaving of variable thickness, extending virtually symmetrically: it is sharply pointed at both beginning and end. However, thickening caused by insufficient overlap on the part of cuts made in sequence can be superimposed on the continuous advancement and retraction. In this respect, the method according to the invention, and the shape of the chips, are fundamentally different from the severing of pipes by a modified "swiveling", where comma-shaped chips of unchanging shape are always produced. The new method according to the invention could best be defined as "spiral-chip turning".

The knife head shaft may be supported directly in the housing if the housing then executes a planetary movement. This may be accomplished, for instance, by receiving the housing, with the aid of two attached tabs, in eccentric shafts in bearing blocks disposed laterally and seated on the carriage. The eccentric shafts, both synchronous, are each caused to rotate by a separate drive mechanism.

The interrupted severing operation can also be attained in other ways.

Thus a mechanical solution, in which a quasi-planetary movement is attained purely mechanically, is also advantageous. Here the cutting knives are provided as radially displaceable in the knife holders, and the knives execute a relative movement with respect to the knife holders which is controlled by rolling off on an eccentric path.

However, the decisive fundamental concept of the invention always remains, namely to execute the severing process by "inverse turning" in an interrupted cut, producing long chips yet with a limited chip length, on a workpiece which is at a standstill; for it is only by avoiding high-frequency cutting operations; such as are characteristic of sawing and even of milling, that a cutting procedure can be attained which is comparatively low in noise and thus environmentlly sound.

Further characteristics, provisions, advantages and embodiments of the method and apparatus according to the invention will now be described in greater detail, referring to the drawings; illustrating exemplary embodiments.

BRIEF DESCRIPTION OF THE DRAWINGS

FIG. 1a illustrates the principal of an inverse turning with a back and forth movement;

FIG. 5a illustrates the structure in the embodiment containing a planetary gear.

DESCRIPTION OF THE PREFERRED EMBODIMENTS

Figure 1:
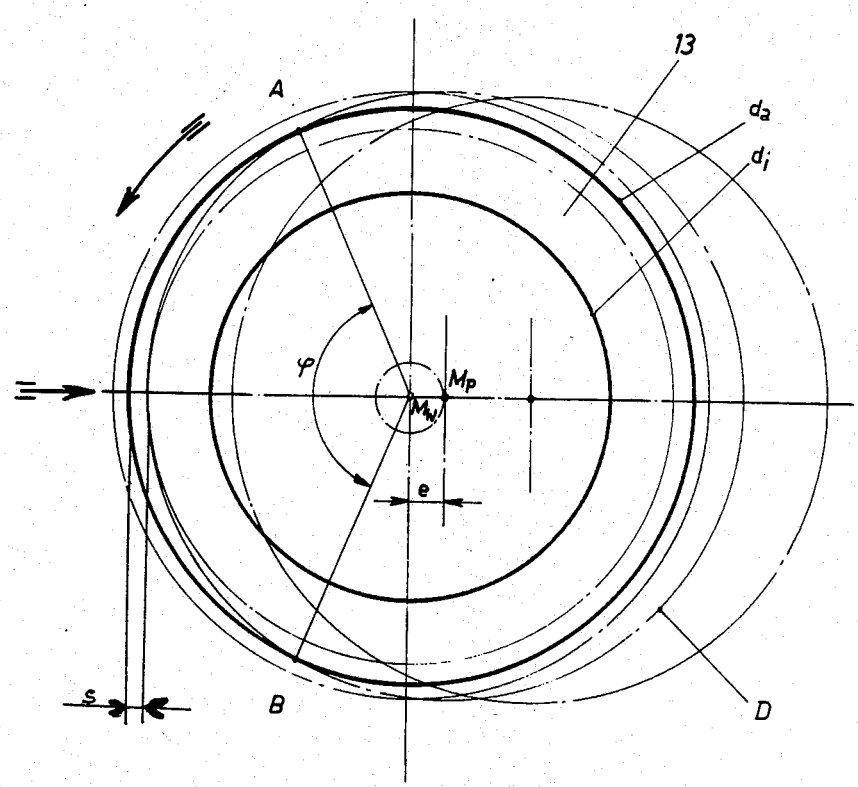
FIG. 1 illustrates the principle of inverse turning using a superimposed planetary movement.

In FIG. 1, reference numeral 13 designates a workpiece having an outside diameter $d_a$ and an inside diameter $d_i$; D is the diameter of the cutting circle, which is selected to be larger than $d_a$ by approximately twice the chip thickness s. A knife head rotates eccentrically relative to the workpiece; it is continuously advanced radially by the amount of the selected chip thickness upon each revolution. In FIG. 1, the location of the cutting circle D is shown during the process E. The knife blade is always in engagement over only a portion of he revolution (engagement angle $\phi$); thus the chip has a limited length.

The point of engagement travels about the workpiece; the center point of the knife head moves over a circular path having an eccentricity e, which is equal to approximately twice the chip thickness. The rotary movement of a hollow working shaft and a planetary shaft may be in the same direction, in which case the engagement angle relative to the tool is smaller, or in opposite directions, in which case the engagement angle relative to the tool is greater. The engagement angle depends substantially on the rpm ratio, the planetary movement generally being the slower; movement in opposite direction is desirable. The chip resembles a crescent; however, because of the unavoidable overlapping, it deviates locally from a geometrically precise crescent shape and can thus be better described as a spiral chip.

FIGS. 2-5 illustrate apparatus which permits chip interruption by means of a back and forth movement or by means of a planetary movement.

Figure 2:
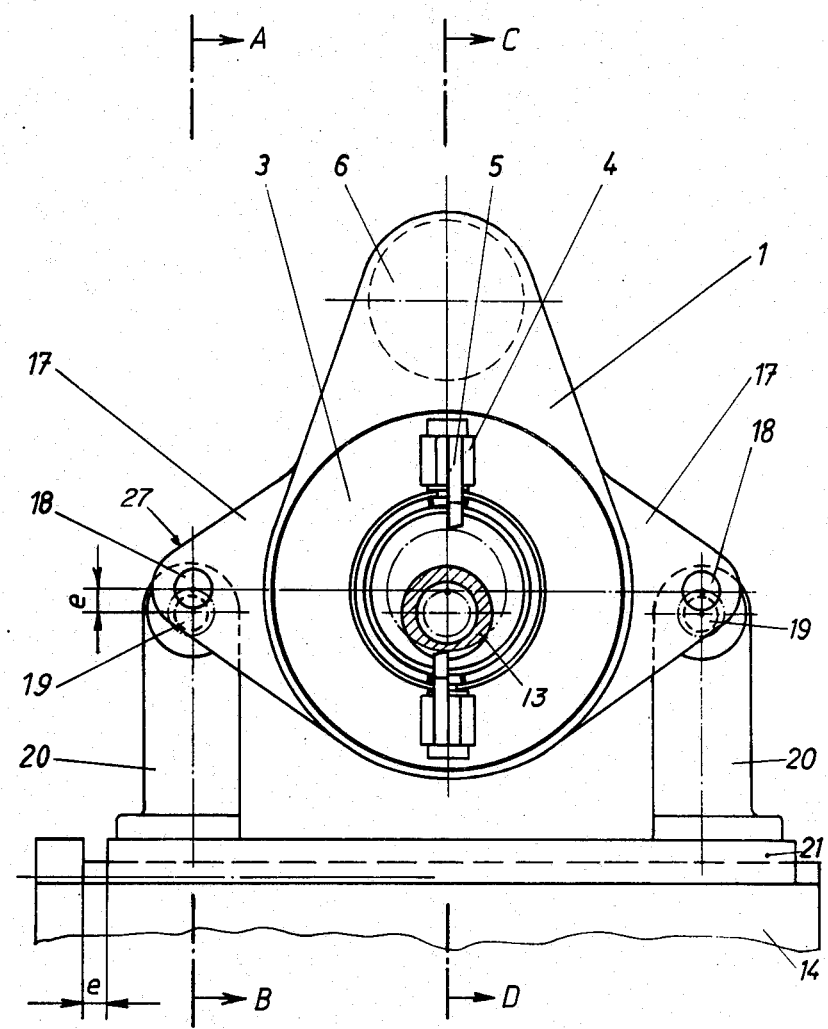
FIG. 2 shows an exemplary embodiment for a cutting device having planetary movement, seen in an end view.

FIG. 2 shows a housing 1 of a cutting device in end view having laterally attached housing tabs 17, in which tangs 18 of eccentric shafts 19 are supported. The eccentric shafts 19 rotate in bearing blocks 20, driven by their own, infinitely variable, drive motor 27. The connection between the two eccentric shafts has been left out of the drawing for the sake of better clarity. The bearing blocks 20 are mounted on a base plate 21, which can be displaced on a transverse carriage 14 transversely to the axis.

Figure 3:
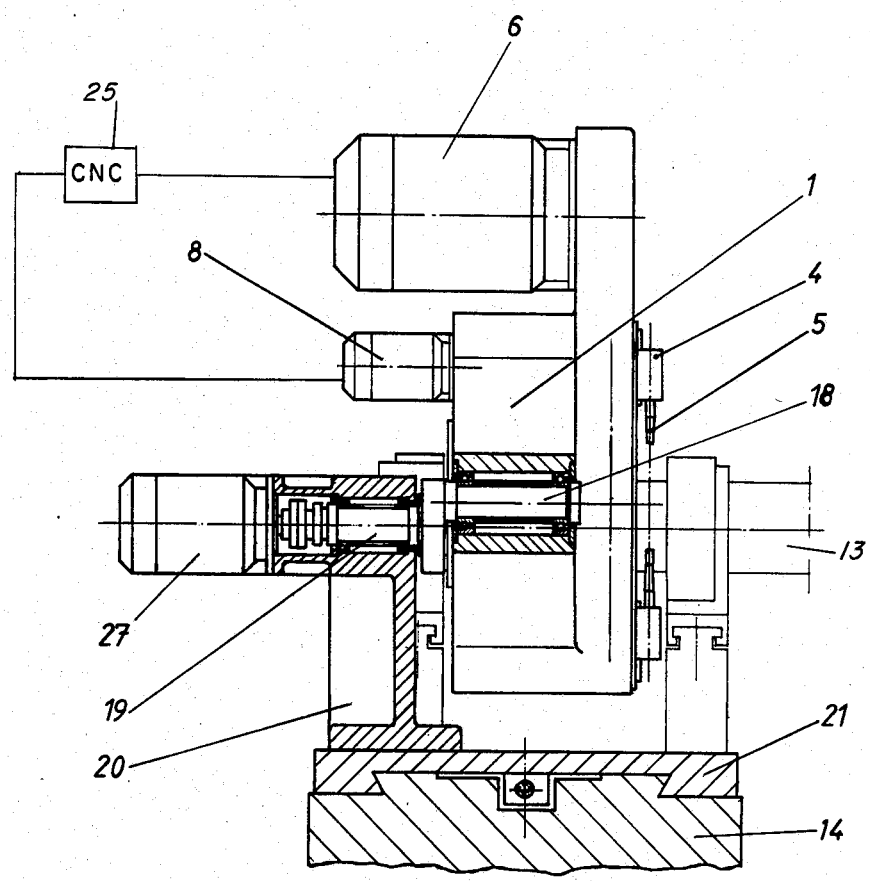
FIG. 3 is a section taken along the line A—B through the receiving blocks.
Figure 4:
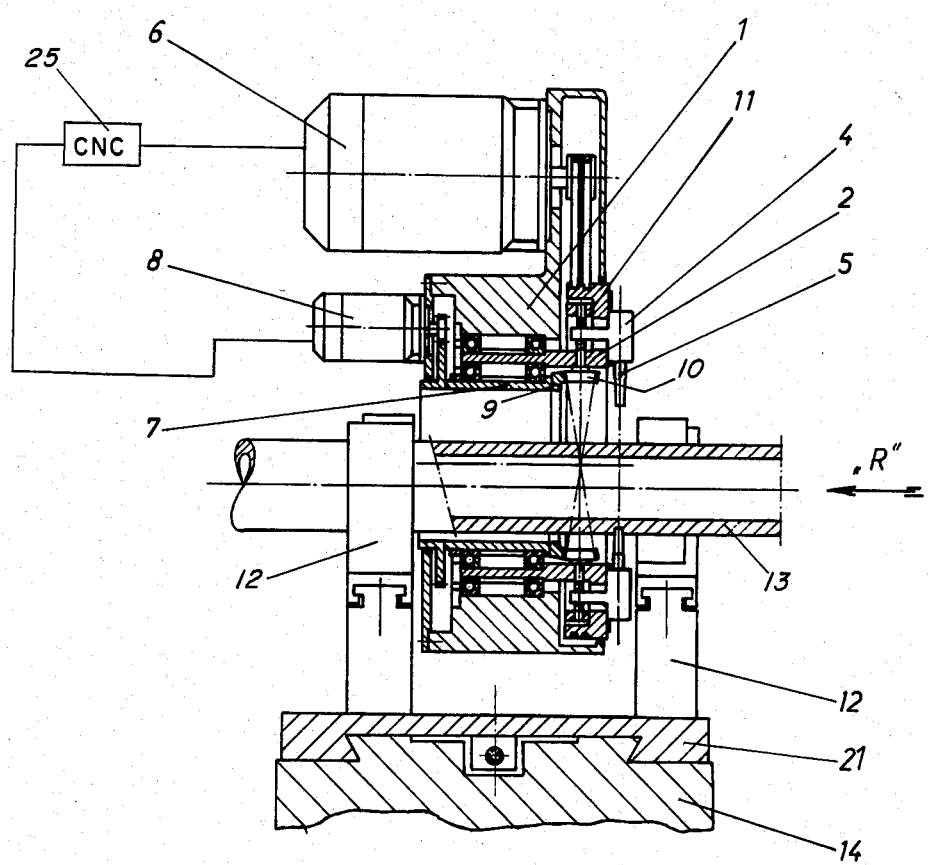
FIG. 4 is a section taken along the line C—D through the axis of the device.

FIG. 3 shows the eccentric operation with attached motor 27 in housing 1, while FIG. 4 shows a hollow working shaft 2 supported in the housing 1 and carries a knife head 3, in which knife holders 4 with cutting knives 5 can be radially advanced. For this advancement, a hollow control shaft 7 is supported in the hollow working shaft 2, and is set to rotating by its own motor 8. The hollow control shaft 7 has a large spur bevel gear 9 on its end toward the cut, which meshes with pinions 10 of the adjusting spindles 11.

In both Figures, the workpiece 13 is shown firmly clamped into place in tension blocks 12, at either side of the cutting site. The bearing blocks 20 are mounted on the base plate 21.

In the basic position, the knife head 3 extends centrally relative to the workpiece 13. The diameter of the circular path of the blades is only slightly larger (by approximately the amount of the selected chip thickness) than the outer diameter of the workpiece 13.

The eccentricity e of the planetary movement is also correspondingly small; generally, it is on the order of magnitude of twice the chip thickness.

At the beginning of the severing operation, first the drive motors 6, 8 (see FIG. 4) of the hollow working shaft 2 and the hollow control shaft 7 are switched on. The device is advanced, for instance by a hydraulic cylinder not shown in the drawing for the sake of clarity, to produce the double eccentricity e, as shown in FIG. 1a, or is moved around the eccentric radius by the planetary movement by means of motor 27 as shown in FIG. 1. The point of engagement is alternately activated by a cylinder during cylindrical movement while, during planetary movement, the point of engagement travels about the workpiece. At the same time, the cutting knives 5 are radially advanced by the slowing of hollow control shaft 7. After the severing is complete, the knives 5 are retracted, and the device is returned to its outset position. It is thus ready for another cutting operation.

Figure 5:
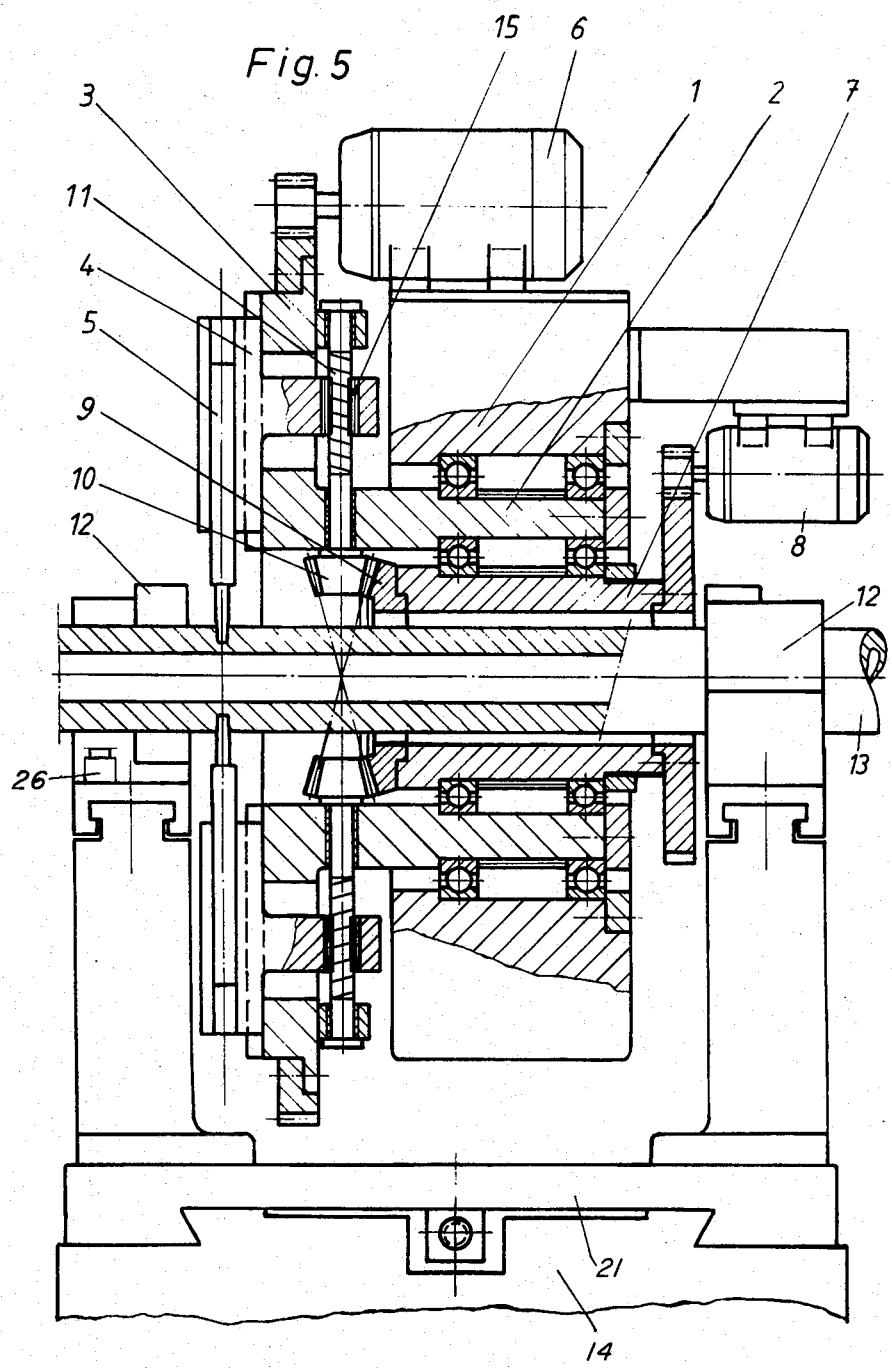
FIG. 5 illustrates the structure of a cutting device having cutting knives which can be advanced in a radially controlled manner in an embodiment with computerized numerical control.

FIG. 5 illustrates a sturdy housing 1 seated on a carriage 14 and adjustable transversely. The hollow working shaft 2, driven for example by an infinitely variable drive motor 6, operates within this housing 1. On the end toward the cut, the hollow working shaft 2 carries the knife head 3, with the radially advanceable knife holders 4 and the knives 5 clamped therein. The hollow control shaft 7, driven by way of example by an infinitely variable electromotor 8, operates centrally within the hollow working shaft 2; on its end toward the cut, it carries a spur bevel gear 9, which meshes with bevel pinions 10, which are seated in turn on the end of two (or more) adjusting spindles 11 supported in the knife head 3. The associated threaded nuts 15 are connected with the knife holders 4.

During idling, the hollow working shaft 2 and the hollow control shaft 7 rotate synchronously; the adjusting spindles 11 remain relatively at rest. If the hollow control shaft 7 remains somewhat retarded in its rotational speed in a controlled manner, then the advancement spindles 11 displace the knife holders 4 and the knives 5 inward; the knife blades begin cutting. This advancing movement lasts as long as and to the extent that the hollow control shaft 7 is rotating at a relatively slower speed. After severing is complete, the knives 5 are retracted in quick-return fashion to the outset position, which is accomplished in that the hollow control shaft 7 rotates faster than the hollow working shaft 2.

This type of structure can be used for a cutting device such as that shown in FIGS. 2, 3 and 4, in which the housing 1 executes a planetary movement; however, it is equally well used for a cutting device in which the housing 1 is seated in stationary fashion on the carriage 14, while the blades execute a simulated planetary movement, accomplished by a controlled relative movement of the hollow control shaft 7 with respect to the hollow work shaft 2, perhaps with the aid of a numerical control means 25 (FIG. 5) or of a planetary gear 22 and a control motor 24 (FIG. 5a).

The workpiece 13 (the pipe) is clamped firmly in tension blocks 12 mounted on a carriage 21.

The constant features of the invention are that the tool circles about the unmoving workpiece, and that the engagement lasts over only an arc of the path of revolution at any one time. In principle, the same method can also be used for severing solid material.

The invention is thus not restricted solely to exemplary embodiments or method steps shown and/or described herein, but rather encompasses any modifications and further developments which may be made by one skilled in the art, as well as partial combinations and subcombinations of the characteristics and steps shown and/or described.

What is claimed is:

1. A method for severing comparatively long workpieces of metal material, at high temperatures, in a normal plane relative to the axis at an arbitrary site with the aid of a cutting tool, comprising:
    fixedly clamping each workpiece being machined on either side of the cutting plane in fixed tension blocks,
    providing a cutting tool which comprises at least one knife firmly inserted in a knife head seated at the end of a hollow working shaft,
    causing said at least one knife to travel in a circle about the workpiece,
    making a periodically interrupted cut and thereby producing a chip of limited length,
    said hollow working shaft, being driven by a motor and operating within a housing mounted on an adjustable transverse carriage of a longitudinal guideway, and
    substantially continuously advancing said transverse carriage toward the workpiece axis, while briefly retracting the carriage out of the cut by approximately the measure of the chip thickness following each completion of substantially one revoltuion, and then immediately thereafter returning and transversely further advancing said carriage by the amount of the selected chip thickness.

2. A method as defined by claim 1, comprising the further step of providing computerized numerical control means for controlling the radial advance of the knife such that the at least one knife describes a quasicircular arc approximately analogous to a planetary movement and the at least one knife execute(s) a superimposed radial advancement movement.

3. A method as defined by claim 1, comprising interconnecting said hollow working shaft and a hollow control shaft via a planetary gear, and causing, via the planetary ring of said planetary gear, a relative movement between the hollow working shaft and the hollow control shaft which radially displaces the at least one knife.

4. A method as defined by claim 1, and further comprising the step of increasing the rotational speed of the hollow working shaft in proportion with the cutting depth.

5. A method as defined by 1, and further comprising the steps of providing a temperature measuring device, and monitoring the temperature of the workpiece so that if there is a failure to attain this temperature blocks the cutting tool.

6. A method as defined by claim 1, comprising causing said housing to execute a planetary movement the rotational direction of which is inverse to the rotational direction of the hollow working shaft.

7. An apparatus for severing comparatively long workpieces of metal material, at high temperatures for example, steel glowing red-hot, in a normal plane relative to the axis at an arbitrary site with the aid of a cutting tool, comprising:
    a knife head equipped with cutting knives seated on the end nearer the cut of a hollow working shaft rotating within a housing,
        said housing carrying two laterally attached, axially parallel tabs having bearing bores, said housing further being received in tangs of eccentric shafts which rotate in bearing blocks seated on a base plate,
        said shafts being driven by an electromotor which substantially is infinitely variable, said eccentric shafts of the two bearing blocks being interconnected for the purpose of synchronous rotation,
        the cutting knives being radially displaceably accommodated in the knife head, and being continuously advanced toward the workpiece during the cutting process by the amount of one selected chip thickness per revolution,
    a hollow control shaft supported centrally in the hollow working shaft and carrying said knife head,
        said hollow control shaft carrying, on an end thereof toward the cut, a large spur bevel gear for meshing with bevel pinions of advancement spindles for the radially displaceable knife holders,
        said hollow control shaft being driven by a controllable drive motor and rotating in synchronism with said hollow working shaft during idling, but during the cutting procedure causing the hollow control shaft to execute a relative movement with respect to the hollow working shaft.

* * * * *